US009987749B2

(12) United States Patent
Nagendran et al.

(10) Patent No.: US 9,987,749 B2
(45) Date of Patent: Jun. 5, 2018

(54) CONTROL INTERFACE FOR ROBOTIC HUMANOID AVATAR SYSTEM AND RELATED METHODS

(71) Applicant: University of Central Florida Research Foundation, Inc., Orlando, FL (US)

(72) Inventors: Arjun Nagendran, Oakland, CA (US); Brian Kelly, Winter Garden, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 36 days.

(21) Appl. No.: 14/827,701

(22) Filed: Aug. 17, 2015

(65) Prior Publication Data
US 2016/0046023 A1    Feb. 18, 2016

Related U.S. Application Data

(60) Provisional application No. 62/037,944, filed on Aug. 15, 2014.

(51) Int. Cl.
*B25J 9/16* (2006.01)
*B25J 13/00* (2006.01)
(Continued)

(52) U.S. Cl.
CPC .......... *B25J 9/1689* (2013.01); *B25J 9/0081* (2013.01); *B25J 9/1605* (2013.01); *B25J 9/1615* (2013.01);
(Continued)

(58) Field of Classification Search
CPC ...... B25J 9/0081; B25J 9/1605; B25J 9/1615; B25J 9/1689; G05B 2219/36436;
(Continued)

(56) References Cited

U.S. PATENT DOCUMENTS 7,791,608 B2 * 9/2010 Henson .................. G06T 13/40
345/473
8,265,791 B2 * 9/2012 Song ...................... B25J 9/1664
700/250
(Continued)

OTHER PUBLICATIONS

S. Calinon, et al., "Incremental Learning of Gestures by Imitation in a Humanoid Robot", HRI '07, Mar. 8-11, 2007, Arlington, Virginia, USA, pp. 255-262.
(Continued)

*Primary Examiner* — Khoi H Tran
*Assistant Examiner* — Robert T Nguyen
(74) *Attorney, Agent, or Firm* — Nilay J. Choksi; Smith & Hopen, P.A.

(57) ABSTRACT

A system and method for controlling a humanoid robot from a remote location are provided. One or more sensing devices are used to sense positions and movements of a user at an inhabiter station. A computing device generates a virtual character based upon the sensed positions and movements of the user and provides a plurality of outputs for controlling the humanoid robot based upon motion of the virtual character. The computing device includes a master controller to generate the virtual character and its behaviors and to transmit instructions to control motion of the humanoid robot to a slave controller located at the humanoid robot, providing smooth and natural motion of the humanoid robot. The method permits switching between multiple virtual characters in a single scene to control and alter the behavior of one or more humanoid robots located in several geographic locations.

33 Claims, 9 Drawing Sheets

(51) Int. Cl.
*B25J 13/06* (2006.01)
*B25J 13/08* (2006.01)
*B25J 5/00* (2006.01)
*B25J 9/00* (2006.01)

(52) U.S. Cl.
CPC ............. *G05B 2219/36436* (2013.01); *G05B 2219/36442* (2013.01); *G05B 2219/40116* (2013.01); *G05B 2219/40264* (2013.01)

(58) Field of Classification Search
CPC ........... G05B 2219/36442; G05B 2219/40116; G05B 2219/40264
USPC .......................... 700/248, 258, 259, 260, 264
See application file for complete search history.

(56) References Cited

U.S. PATENT DOCUMENTS

| | | | | |
|---|---|---|---|---|
| 9,056,396 | B1* | 6/2015 | Linnell | G05B 19/427 |
| 9,327,396 | B2* | 5/2016 | Kim | B25J 3/00 |
| 9,381,426 | B1* | 7/2016 | Hughes | H04L 67/06 |
| 2003/0215130 | A1* | 11/2003 | Nakamura | G06T 7/20 |
| | | | | 382/154 |
| 2006/0061574 | A1 | 3/2006 | Ng-Thow-Hing et al. | |
| 2008/0082214 | A1* | 4/2008 | Haskell | G06T 13/40 |
| | | | | 700/264 |
| 2008/0086696 | A1* | 4/2008 | Sri Prakash | G06Q 10/00 |
| | | | | 715/757 |
| 2010/0250001 | A1* | 9/2010 | Hodgins | B62D 57/032 |
| | | | | 700/261 |
| 2011/0175918 | A1* | 7/2011 | Liu | G06T 13/40 |
| | | | | 345/473 |
| 2011/0288682 | A1 | 11/2011 | Pinter et al. | |
| 2012/0038739 | A1* | 2/2012 | Welch | G06T 15/04 |
| | | | | 348/14.01 |
| 2012/0041599 | A1* | 2/2012 | Townsend | B25J 3/04 |
| | | | | 700/275 |
| 2012/0143374 | A1* | 6/2012 | Mistry | B62D 57/032 |
| | | | | 700/259 |
| 2012/0299827 | A1* | 11/2012 | Osborn | G09G 5/08 |
| | | | | 345/158 |
| 2013/0073084 | A1* | 3/2013 | Ooga | B25J 9/1633 |
| | | | | 700/254 |
| 2013/0077820 | A1* | 3/2013 | Marais | G06K 9/6257 |
| | | | | 382/103 |
| 2013/0211592 | A1* | 8/2013 | Kim | B25J 3/00 |
| | | | | 700/258 |
| 2013/0211594 | A1* | 8/2013 | Stephens, Jr. | B25J 9/1689 |
| | | | | 700/259 |
| 2014/0019374 | A1 | 1/2014 | Huang et al. | |
| 2014/0052152 | A1* | 2/2014 | Au | A61B 34/10 |
| | | | | 606/130 |
| 2014/0087871 | A1* | 3/2014 | Kruglick | A63F 13/58 |
| | | | | 463/31 |
| 2015/0051734 | A1* | 2/2015 | Zheng | B25J 9/1633 |
| | | | | 700/261 |
| 2015/0202768 | A1* | 7/2015 | Moridaira | B62D 57/032 |
| | | | | 700/258 |
| 2016/0243699 | A1* | 8/2016 | Kim | B25J 9/1605 |
| 2016/0267699 | A1* | 9/2016 | Borke | G02B 27/2292 |
| 2016/0270867 | A1* | 9/2016 | Scholan | A61B 34/30 |

OTHER PUBLICATIONS

S. Nakaoka, et al., "Generating Whole Body Motions for a Biped Humanoid Robot from Captured Human Dances", Proceedings of the 2003 IEEE Internatinal Conference on Robotics & Automation, Taipei, Taiwan, Sep. 14-19, 2003, pp. 3905-3910.
R. Marin, et al., "A Multimodal Interface to Control a Robot Arm via the Web: A Case Study on Remote Programming", IEEE Transactions on Industrial Electronics, vol. 52, No. 6, Dec. 2005, pp. 1506-1520.
P. Trahanias, et al., "TOURBOT—Interactive Museum Tele-presence Through Robotic Avatars", Proc. of the 9th Int. WWW Conf., Culture Track, Amsterdam, Netherlands, May 15-19, 2000, 10 pgs.
N. Pollard, et al., "Adapting Human Motion for the Control of a Humanoid Robot", Proceedings of the IEEE International Conference on Robotics and Automation, Washington, DC, 2002, 8 pgs.
S. Tachi, et al. "Telexistence cockpit for humanoid robot control", Advanced Robotics, vol. 17, No. 3, Sep. 2003, pp. 199-217.
C. J. Bell, et al., "Control of a humanoid robot by a noninvasive brain-computer interface in humans", Journal of Neural Engineering, vol. 5, 2008, pp. 214-220.

* cited by examiner

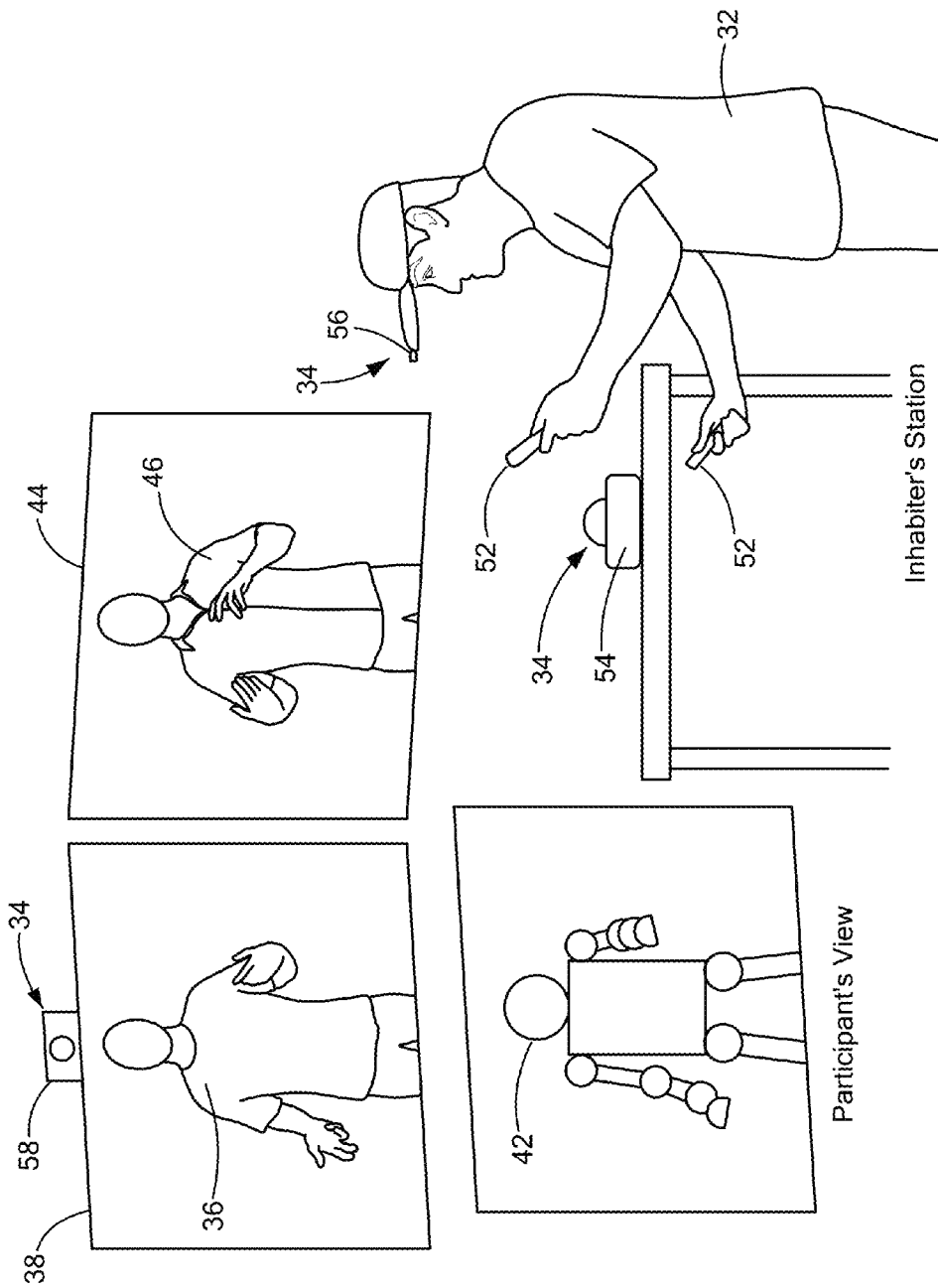

CONTROL INTERFACE FOR ROBOTIC HUMANOID AVATAR SYSTEM AND RELATED METHODS

CROSS REFERENCE TO RELATED APPLICATIONS

This application claims priority under 35 § 119(e) of U.S. Provisional Application No. 62/037,944, filed on Aug. 15, 2014, entitled "Control Interface for Robotic Humanoid Avatar System and Related Methods", the disclosure of which is hereby incorporated by reference.

STATEMENT REGARDING FEDERALLY SPONSORED RESEARCH OR DEVELOPMENT

The invention was developed with financial support from Grant/Contract No. N0014-12-1-0052 from the Office of Naval Research. The U.S. Government has certain rights in the invention.

BACKGROUND

Previous research has addressed the concepts of inhabiting a humanoid robot through an intuitive user interface. In (Trahanias, Argyros, et al., 2000), the authors' presented a system, "Tourbot", which enabled users to remotely explore a museum through a robotic avatar. Instead of allowing the user to directly control the robot's motion, users were given a set of high level commands such as what exhibit to view, promoting ease of use. Additionally, (Marn, Sanz, et al., 2005) created a highly general control system for manipulating a robot arm that allowed both high level voice commands and low level remote programming through Java. Another project (Bell, Shenoy, et al., 2008) explored a noninvasive brain computer interface using electroencephalography (EEG). Because of the large amount of noise associated with EEG, the authors focused on robot control through simple high level commands. This work focused on indirect control, in which individual joints are not mapped onto a robot.

In other research, (Tachi, Komoriya, et al. 2003) presented a "telexistence cockpit" capable of remotely controlling a robot. The user interface consisted of two "master arms," a head mounted display (HMD), and a motion base located in the cockpit. A user would manipulate the master arms to control the slave robot arms. Additionally, the motion base was used to communicate robot translation and the HMD adjusted the view perspective.

Other researchers have explored how human motion can be realistically mapped onto a robot. In (Pollard, Hodgins, et al., 2002), the authors prerecord human motion and map the resulting animation onto a robot. Because a human has many more degrees of freedom than the robot, the human body was divided into segments and the overall rotations from these segments were mapped onto the robot. Furthermore, the authors scaled the original animation to fit inside the range of motion of the robot's joints.

Another related paper (Nakaoka, Nakazawa, et al., 2003) addressed the more specific problem of mapping a human dance onto a robot surrogate. The researchers motion captured a human dance performance, and the resulting animation was then divided into a set of important postures for a robot to assume. The authors were interested in full body motion, and as a result, had to modify the captured data to ensure the robot would maintain its balance.

The previous approaches are limited by the quality of the motion capture software, and in some cases may not replicate the motion as desired. In (Calinon and Billard, 2007), the authors presented a method of teaching a robot a gesture through a two phase process. In the first phrase, a human coach, wearing several motion sensors, performed a gesture while the robot observed. In the second phase, the coach was allowed to grab and move the robot arms to refine the gesture.

SUMMARY OF THE INVENTION

The present invention relates to a user control interface to generate a virtual character and map the virtual character's behavior to a remotely located physical humanoid robot that functions as a user's surrogate. More particularly, a control interface is provided using a master-slave architecture to allow a user to interact with elements in a remote environment via a physical entity, a humanoid robot, located in the remote environment. The user, who may also be called an inhabiter, is able to inhabit the robot by controlling a virtual character via a master controller. The virtual character behaves as a master that sends control signals to a remote slave (robot) coupled to the master controller. The system can employ simple, inexpensive, and noninvasive user interface devices that are operated by the user as inputs to a master controller that generates animations of the virtual character based on the inputs. This approach obviates the need to directly link the joints of the user and the robot; instead, it relates the virtual character to the robot. Position, velocity and torque profiles are determined to reduce the discrepancy between the virtual character and the robot. This approach also addresses the limited degrees of freedom and range of motion of the robot relative to the degrees of freedom available to a virtual character. An increase or reduction in the degrees of freedom can be performed to preserve motion profiles between a virtual character and a robot. This approach does not require the capture of human motion through a set of motion sensors. The use of an animation for a virtual character eliminates the need for training the robot.

Other aspects of the method and system include the following:

1. A system for controlling a humanoid robot from a remote location, the system comprising:
   one or more sensing devices to sense positions and movements of the user; and
   a computing device in communication with the one or more sensing devices, the computing device comprising one or more processors and memory, and including computer-executable instructions stored in the memory that, upon execution by the one or more processors, generate a virtual character based upon the sensed positions and movements of the user and provide a plurality of outputs for controlling the humanoid robot based upon motion of the virtual character.

2. The system of item 1, wherein the one or more processors of the computing device include a master controller operative to generate the virtual character and to translate motion of the virtual character into instructions to control motion of the humanoid robot, the master controller in communication with a slave controller located at the humanoid robot to transmit the instructions to the slave controller.

3. The system of any of items 1-2, wherein the master controller includes a graphics rendering engine and a physics engine including instructions operative to translate motions of the user into a three-dimensional animation of the virtual character.

4. The system of any of items 1-3, wherein the virtual character is generated by creating an animation from the sensed positions and motions of the user.

5. The system of any of items 1-4, wherein the animation comprises an interpolation between key frames or between time-positions or a combination thereof.

6. The system of any of items 1-5, wherein the computing device is operative to provide a real time mapping between motions of the user and motions of the humanoid robot.

7. The system of any of items 1-6, wherein the computing device is operative to determine a torque or force to apply to a joint of the humanoid robot based on one or more accelerations of one or more joints of the virtual character.

8. The system of any of items 1-7, wherein a number of degrees of freedom of motion of the virtual character is greater than a number of degrees of freedom of motion of the humanoid robot.

9. The system of any of items 1-8, wherein the virtual character has a number of joints, each joint corresponding to a joint of the user, and the computing device is operative to assign a uniform coordinate system to each joint of the virtual character.

10. The system of any of items 1-9, wherein the computing device is operative to store in memory data comprising at least one of pitch, yaw, and roll orientation for each joint, the joints including at least one of a shoulder joint, an elbow joint, a wrist joint, a finger joint, a neck joint, a waist joint, a hip joint, a knee joint, and an ankle joint.

11. The system of any of items 1-10, wherein the virtual character has a number of joints, each joint corresponding to a joint of the user, and the computing device is operative to store an orientation of each joint of the virtual character as a quaternion, and includes instructions to transform the orientation of each joint of the virtual character to an orientation of each joint of the humanoid robot stored as an Euler angle.

12. The system of any of items 1-11, wherein the transform instruction comprises mapping the set of orientations for each joint of the virtual character to the set of orientations for each joint of the humanoid robot.

13. The system of any of items 1-12, further comprising constructing a new set of orientations for each joint of the virtual character by applying a rotation operation to each joint.

14. The system of any of items 1-3, further comprising mapping multiple joints of the virtual character to a single joint of the humanoid robot.

15. The system of any of items 1-14, wherein the mapping comprises generating a reduced set having a reduced number of orientations of the virtual set equal to the number of joints of the humanoid robot, the reduced set including a quaternion equal to a top rotation of a hierarchy of joints and a rotation of a leaf joint of the humanoid robot.

16. The system of any of items 1-15, further comprising converting the reduced set of orientations to a converted set of orientations of the joints of the humanoid robot utilizing a Denavit-Hartenberg convention applicable to a corresponding joint of the humanoid robot.

17. The system of any of items 1-16, further comprising extracting an Euler angle for the corresponding joint of the humanoid robot.

18. The system of any of items 1-17, wherein:
the computing device provides a plurality of selectable micro-poses on the display and receives a selected micro-pose via input from the user; and
the computing device causes the humanoid robot to perform the selected micro-pose.

19. The system of any of items 1-18, wherein the one or more sensing devices comprise a physical input device coupled to the computing device to input physical motions of the user to the computing device.

20. The system of any of items 1-19, wherein the physical input interface comprises a joystick device, a magnetic tracking device, a motion sensing device, an image-based motion recognition device, a depth-based motion recognition device, an infrared (IR) motion sensing device, or combinations thereof.

21. The system of any of items 1-20, wherein the one or more sensing devices comprise one or more reflective markers positioned on a head of the user, and an infrared (IR) image sensor coupled to the computing device to determine a head position of the user based upon tracking of the one or more reflective markers.

22. The system of any of items 1-21, wherein the computing device controls head motion of the humanoid robot based upon a head position of the user.

23. The system of any of items 1-223, wherein the computing device controls arm motion of the humanoid robot based upon an arm position of the user.

24. The system of any of items 1-23, wherein the computing device provides corresponding pluralities of outputs for controlling a plurality of humanoid robots in different locations.

25. The system of any of items 1-24, wherein the computing device provides a menu stored in the memory and displayable on a display for selecting a current humanoid robot from the plurality thereof.

26. The system of any of items 1-25, wherein the computing device provides a plurality of virtual characters configurations stored in memory and receives a selected virtual character configuration from the user.

27. The system of any of items 1-26, wherein the computing device is operative to switch between selected virtual characters in real time upon input of an updated virtual character selection from a user.

28. The system of any of items 1-27, wherein any of the plurality of virtual characters can be used to control the humanoid robot.

29. The system of any of items 1-28, wherein the computing device includes stored in the memory a plurality of motions of the virtual character, each motion representative of a user behavior.

30. The system of any of items 1-30, further comprising a display coupled to the computing device to provide a third person view of the virtual character as a representation of a user and a first person view from the at least one humanoid robot;

31. The system of any of items 1-30, wherein the display comprises a first display device coupled to the computing device to provide the third person view of the virtual character and a second display device coupled to the computing device to provide the first person view from the humanoid robot.

32. The system of any of items 1-31, wherein the computing device includes instructions operative to display the third person view of the virtual character and the first person view from the humanoid robot as separate screens or windows on one display device or on two display devices.

33. The system of any of items 1-33, wherein the system further includes a microphone to record audio from the user in real-time and the computing device includes instructions to transmit recorded or live audio to the humanoid robot synchronized with the sensed positions and movements of the user.

34. A humanoid robot system comprising:
the system for controlling a humanoid robot from a remote location of any of items 1-33; and
a humanoid robot in communication with the control system.
35. The system of any of items 1-34, wherein the computing device comprises a master controller, comprising a processor and memory, to generate the virtual character and to translate motion of the virtual character into instructions to control motion of the humanoid robot, and
further comprising a slave controller, comprising a processor and memory, to receive instructions from the master controller, the slave controller located at and in communication with the at least one robotic humanoid avatar.
36. The system of any of items 1-35, wherein the humanoid robot includes one or more joints, an actuator connected to each joint to control rotation of the connected joint, and the computing device is operative to transmit instructions to the slave controller to actuate rotation of a selected joint via the connected actuator.
37. A method for controlling a humanoid robot from a remote location, comprising:
sensing positions and movements of a user;
storing sensed positions and movements of the user as a virtual character in a computing device;
sending outputs to the humanoid robot to control motion of the humanoid robot based on the sensed positions and movements of the user.
38. The method of item 37, further comprising generating the virtual character at a master controller of the computing device, translating motion of the virtual character into instructions to control motion of the humanoid robot, and transmitting the instructions to a slave controller located at the humanoid robot.
39. The method of any of items 37-38, further comprising creating an animation of the virtual character from the sensed positions and motions of the user.
40. The method of any of items 37-39, further comprising mapping in a real time motions of the virtual character to motions of the humanoid robot.
41. The method of any of items 37-40, further comprising determining a torque or force to apply to a joint of the humanoid robot based on one or more accelerations of one or more joints of the virtual character.
42. The method of any of items 37-41, further comprising reducing a number of joints of the virtual character to a reduced set corresponding to a number of joints of the humanoid robot.
43. The method of any of items 37-42, further comprising storing an orientation of a joint of the virtual as a quaternion, and transforming the quaternion to an orientation of a joint of the humanoid robot as a Euler angle.
44. The method of any of items 37-43, further comprising mapping multiple joints of the virtual character to a single joint of the humanoid robot.
45. The method of any of items 37-44, further comprising sensing positions and movements of the user by receiving input signals from a physical input device, the physical input device comprising one or more of a joystick device, a magnetic tracking device, a motion sensing device, or an infrared motion sensing device.
46. The method of any of items 37-45, further comprising sensing positions and movements of the user by tracking one or more reflective markers positioned on a head of the user with an infrared image sensor to determine a head position of the user.
47. The method of any of items 37-46, further comprising controlling arm motion of the humanoid robot based upon arm motion of the user.
48. The method of any of items 37-47, further comprising controlling head motion of the humanoid robot based upon head motion of the user.
49. The method of any of items 37-48, further comprising proving a plurality of virtual character configurations and receiving a selected virtual character from a user.
50. The method of any of items 37-49, further comprising switching between selected virtual characters in real time upon input of an updated virtual character selection from a user.
51. The method of any of items 37-50, wherein any of the plurality of virtual characters can be used to control the humanoid robot.
52. The method of any of items 37-51, further comprising sending outputs to a second humanoid robot to control motions of the second humanoid robot based on the sensed positions and movements of the user.

DESCRIPTION OF THE DRAWINGS

The invention will be more fully understood from the following detailed description taken in conjunction with the accompanying drawings in which:

FIG. 2 is a schematic illustration of an embodiment of an inhabiter's station;

DETAILED DESCRIPTION OF THE INVENTION

This application incorporates by reference the entire disclosure of U.S. Provisional Application No. 62/037,944, filed on Aug. 15, 2014, entitled "Control Interface for Robotic Humanoid Avatar System and Related Methods".

A surrogate can be defined as a substitute or stand-in for a person in a context-specific role. Human surrogates can take several forms, ranging from a virtual character in a virtual world to a robotic or fully physical representation of a specific person in a real environment. The surrogate provides access to an environment that is otherwise not readily accessible to the person controlling the surrogate for reasons such as a physical disability that prevents the person from being present in the environment, maintaining anonymity, lack of time or resources to be physically present in the environment, accessing relatively dangerous locations, and the like.

Figure 1:
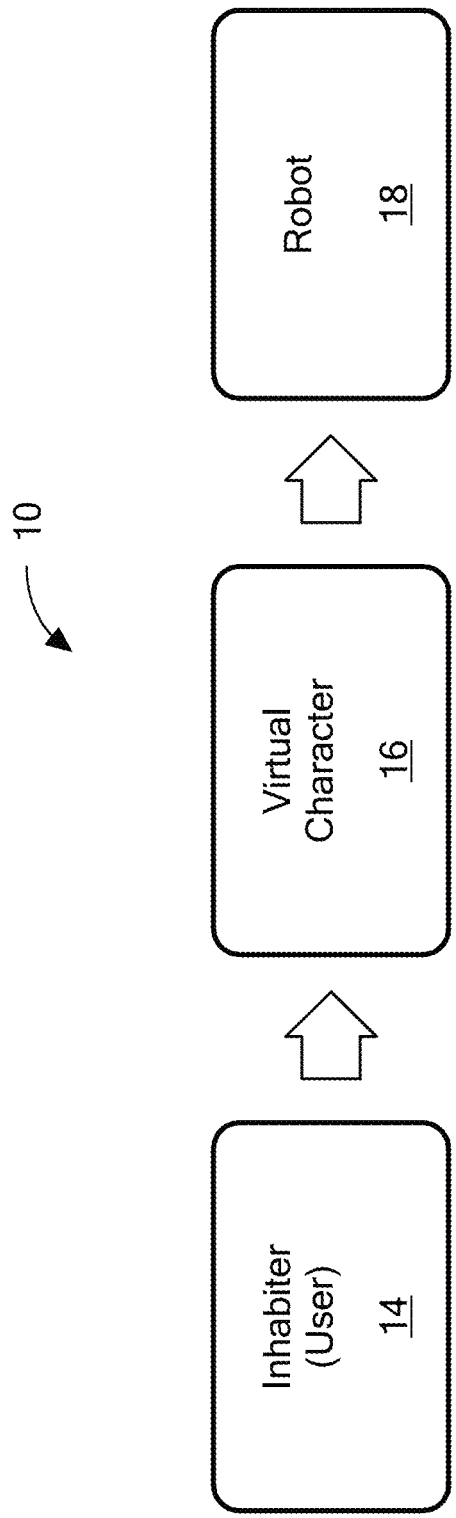
FIG. 1 is a schematic illustration of a control interface system and method for controlling a humanoid robot.

The present invention relates to control of a humanoid robot that provides a physical representation in a real environment of a surrogate of a person located remotely from the robot. Referring to FIG. 1, the system 10 provides an inhabiter 14 (a user) the ability to control a virtual character 16 that in turn controls a robot 18. A robot as controlled herein can offer advantages to the user controlling it (the inhabiter) by supporting bi-directional communication involving both verbal and non-verbal cues to another person interacting with the robot at the robot's location. Such humanoid robots can have several applications, including training, rehabilitation, and education. So that people can interact naturally with the robot, the robot can be capable of (i) appearing natural without destroying the beliefs of the people interacting with it (plausibility) and (ii) eliciting behavioral responses in the people with whom it interacts. For instance, the robot can exhibit natural looking motion in the form of kinematics and facial expressions as well as auditory stimuli to evoke an empathetic response. The robot can exhibit dynamic stability if a need for contact or touch between the robot and a real person arises.

Toward these ends, a control interface is provided with minimally invasive sensing that captures and transmits an inhabiter's intent, via, for example, head and arm motions, so the inhabiter can take control of movement of the robot. The paradigm supports a first person view of an environment via the robot. This allows an inhabiter to see "through the eyes" of the robot and perform actions in the remote environment appropriately. The paradigm includes algorithms that interpret the data received over the network (with a chance of packet-loss) to create smooth and natural motion profiles at the robot's end. It reduces cognitive loads on the inhabiter and reduces the amount of network traffic transmitted during inhabiting. Such robots can be used in all walks of life, including training (for instance, when the inhabiter is a subject matter expert (SME) offering advice to a remotely-located group of people), therapy (where a patient converses with a therapist in a distant geographic location via the robot), or education (where a student attends a classroom lecture via a robot, enabling the student to interact naturally with other classmates.

The control interface also allows a humanoid robot to seamlessly switch between a number of different surrogates, automatically adopting behaviors associated with each surrogate, as controlled by the inhabiter. Such multiple surrogate embodiments can be used, for example, in cultural awareness training. The control interface can also support hybrid control of a robot using both artificial intelligence and direct human control.

Humanoid robots that can be inhabited using the control interface described herein are known and are commercially available. Such humanoid robots include a head, typically with a camera to provide a video feed of what the robot sees. Some humanoid robots can also include features such as a vacuuformed face and a rear-projected head allowing the robot to change its facial appearance. Humanoid robots also typically include a torso supporting a neck that mounts the head as wells as arms and hands. Legs or other mobility mechanisms (such as wheels or whegs, i.e., wheeled legs) can also be provided in some robots. Joints provide rotation—yaw, pitch, and/or roll—of the various body parts to effect movement. Any suitable actuator, such as electric servo motors or pneumatic or hydraulic actuators, can be used to effect rotation of the joints. Some robots use a combination of electric and pneumatic actuation with passive compliance elements paired in an antagonistic manner to support highly natural looking motion. For example, pneumatic fluidic muscles in the form of a fiber cylinder that contracts in length and expands in diameter when filled with air can be used to provide naturalistic motion in arms or legs of a robot. For instance, a robot can be fitted with fluidic muscles to control arm joints, such as a shoulder joint (roll, pitch, and yaw), an elbow joint (pitch), and a wrist joint (pitch). Independent servo motors can be used to control the head (roll, pitch and yaw) and the torso (roll, pitch and yaw). Fingers can be actuated in a binary manner (close/open) using a directional control valve with three air ports, and two positions (commonly referred to as a 3/2 pneumatic valve). The natural low impedance characteristics of the pneumatic actuators make them easily back-drivable.

Certain humanoid robots (such as the Robothespian) may employ a user interface that permits graphical user interface (GUI)-based programming of certain pre-defined robot behaviors. This mode is well suited for narration and recorded animations supplied by the present system. Each individual actuator on the robot is also controllable via an application program interface (API), thereby permitting real-time control of the robot. The present control interface interacts with the actuators of the robot to realize and transmit the inhabiter's intent accurately in real-time, while adapting the closed-loop response of the robot's hybrid actuation mechanism to faithfully represent this action.

In some embodiments, the control interface interacts with the robot to control the arms, hands, head, neck, and torso, whereas the legs are not used. Embodiments in which the legs are not used may be suitable for environments where other humans may be present and it is desired to limit movement of the robot for safety concerns. In other embodiments, the legs of the robot can be used as well, allowing the robot to move about its environment.

One example of a commercially available robot that can be used to support human interaction is the Robothespian from Engineered Arts Limited, UK. This robot employs fluidic muscles as described above. The upper torso of the Robothespian has a total of 24 independently controllable degrees of freedom. The fingers of each hand can be opened and closed, although the thumbs are fixed. The force exerted when the fingers are closed and the lack of pronation/supination of the thumb makes it unsuitable for gripping objects. If desired, the legs can also be actuated using proportional pneumatic valves (fluidic muscles).

A user who remotely operates a humanoid robot can also be referred to as an "inhabiter". The inhabiter has the ability to view the remote environment through the robot's eyes and perform actions in the remote environment by transmitting his intent to the robot. To facilitate this, the inhabiter 32 occupies a location referred to as an inhabiter station. See FIG. 2. The inhabiter station is an environment that includes a plurality of sensing devices 34 that allow an inhabiter's intent to be captured via various movements, such as head and arm movements. This data forms what is referred to as "sensory affordances" of the inhabiter station. The sensory affordances are the set of possible joint movements that a user can make using an input device. A set, A_virtual, of affordances can include, for example, at least one of pitch, yaw, and roll orientation for each joint, the joints including at least one of a shoulder joint, an elbow joint, a wrist joint, a finger joint, a neck joint, a waist joint or a hip joint, a knee joint, and an ankle joint. In order to support portability and instantaneous ability to inhabit a surrogate from any location, the set A_virtual of sensory affordances can be kept to a minimum.

The paradigm of the control interface is that of a master-slave system in which any robot (slave) is driven by its virtual counterpart (master). See FIGS. 3A and 3B. The system includes hardware 70, including a computing device 71 having a master controller 72 and memory 74, displays 38, 44, and sensing devices 34, to support inhabiting and a control system including algorithms and other software to control the virtual character (master). A slave controller 82 (at the robot) in communication with the master controller via a network layer 90 receives instruction from the master to reproduce the virtual character's behavior faithfully by the robot hardware instance in the remote location, thereby serving as the inhabiter's surrogate.

While it is possible to directly map an inhabiter's motion to a robot, this generally requires motion sensing on every joint on the kinematic chain. This approach applies a one-to-one mapping in which every joint of both the inhabiter and the robot is tracked and requires that errors between the joints across the inhabiter and the robot be minimized. It requires "literal" motion on the part of the inhabiter and a calibrated kinematic configuration of the robot to faithfully reproduce this motion by the robot. Also, to facilitate first-person control, a first-person view of the environment through the eyes of the robot must be provided. Assuming that tracking and motion can be faithfully reproduced with minimum latency, when the inhabiter moves his head, the robot correspondingly moves its head. A screen with a video feed from a camera at the robot's eyes can allow the inhabiter to look around in the remote environment. However, when the inhabiter looks upwardly or too far out to the side, he is unable to see the screen in front of him, if the screen or display surface is not immersive. If the display is immersive, such as a head-worn display, any latency or delay in the update between the motion of the inhabiter and the motion of the robot may also result in motion-sickness, since the inhabiter's physical motion is not synchronous with the updated video feed from the camera at the robot. An immersive display also reduces the portability and non-intrusive sensing aspects of the inhabiting paradigm.

The present system overcomes these drawbacks by employing a master-slave paradigm in which the inhabiter controls a virtual character instance 36, which can be viewed by the inhabiter 32 on a screen display 38. (See FIG. 2.) In addition, a view through the eyes of a robot 42, for example, of a participant 46, is also provided on a screen display 44. The control interface provides a mapping of the motion of the virtual character to the robot despite a varying number of degrees of freedom. This is achieved by a combination of a coordinate system transform (Equations 2-4 below) to map each joint of the virtual character coordinate space to the joints of the robot in the robot's coordinate space and a reduction transform (Equation 5 below) for instances when the master virtual character has more degrees of freedom at a specific joint than the slave robot, as described further below. The master controller then transmits to the slave controller at the robot standard control instructions comprising a set of joint orientations described, for example, as a set of angular accelerations, to control torques on the joints by the appropriate actuator to effect a desired degree of rotation without affecting other joints in the kinematics chain (Equation 6 below). In this manner, motion of the robot's joints can be effected smoothly and naturally in real time.

A virtual character is created at the master controller that is representative of the user to be the user's surrogate at the robot. The virtual character can be designed to have sufficient degrees of freedom to kinematically represent all motions of humans. This character is then rigged and animated with a set of essential poses that contain a combination of key-frame and time-dependent blending routines. The poses can be chosen based on the required functionality of the surrogate. Also, some commercially available robots can incorporate the virtual character's appearance by virtue of possessing a rear-projected head with vacuuform surface.

The master controller can include a graphics rendering engine to generate an animation of the virtual character. The graphics rendering engine's animation system uses built-in routines to interpolate between the key-frames and time-positions depending on the chosen blending method. In essence, this becomes a free inverse-kinematic solver for the real-world surrogate. The graphics rendering engine can also be combined with a physics engine to solve for the inverse dynamics of the system allowing for decoupled joint control on the surrogate. For instance, given the accelerations at each joint as determined by the master controller using the physics engine, controllable torques on the robot joints are computed using the standard Recursive Newton Euler formulation of Inverse Dynamics:

$$\tau = I(\theta)\ddot{\theta} + c(\dot{\theta},\theta)\dot{\theta} + g(\theta) \qquad (1)$$

where z is the vector of joint torques, $\theta$ is the n-dimensional joint-space position vector, $\dot{\theta}$ is the n-dimensional joint-space angular velocity vector, $\ddot{\theta}$ is the n-dimensional joint-space angular acceleration vector, $I(\theta)$ is an n×n symmetric inertia matrix, $c(\dot{\theta}, \theta)$ is the n×n tensor or velocity coupling matrix, where n is the number of joints, and g is the n×1 gravity-dependent vector. The robot's joints can then be controlled, for example, by driving a DC motor, a pneumatic or hydraulic linear actuator, or actuating a fluidic muscle to produce the desired torque or force. Software modules or routines to control a robot based on inverse dynamics are known and readily available, as are various graphics rendering engines and physics engines.

Inhabiters can also map a character's motion (master) to their intent during a calibration phase (described further below), which gives each inhabiter the ability to modify the controls to the real-world surrogate while keeping cognitive loads to a minimum.

The robot is considered a slave during this operation. Robots can have a varying number of degrees of freedom depending on their complexity. Some of these degrees of freedom can be manipulable in the continuous-time domain while others can be discrete. Together, this forms the set A_robot of "robot affordances." A co-ordinate transform function maps the "sensory affordances" of an inhabiter to the "robot affordances" via the virtual character (master) in real-time. In some instances, this is a one-one mapping, while in others, a difference transform between relevant joint space variables is applied to achieve the required configuration.

The need for a coordinate transform function stems from differences in coordinate frames between the virtual character and the robot. In the case of the virtual character, a three dimensional engine can be employed to assign a uniform coordinate system to each joint. However, the robot uses the Denavit-Hartenberg (DH) convention for its joint space parameters. The DH convention standardizes coordinate frames for links in a kinematic chain. More formally, a function is provided that maps A_virtual to A_robot as defined below.

$$A\_virtual=\{vx_i,vy_i,vz_i,vw_i|i=1{:}n\} \quad (2)$$

$$A\_robot=\{rx_j,ry_j,rz_j|j=1{:}m\} \quad (3)$$

where n is the number of joints for the virtual character, m is the number of joints for the robot, $(vx_i, vy_i, vz_i, vw_i)$ is the orientation of joint i in the virtual character stored as a quaternion, and $(rx_i, ry_i, rz_i)$ is the orientation of joint j in the robot stored using Euler angles.

In order to create this mapping, an initialization pose from A_virtual is equated to an initialization pose from A_robot. Upon start up, a robot assumes an initialization pose, generally looking forward. The orientation of the actuators and joints of the robot's initialization pose are specified by the robot's manufacturer, for example, in the robot's documentation. Similarly, the virtual character assumes an initialization pose. These poses must be equated so that motion of the virtual character can be coordinated with motion of the robot. To do this, for each joint in the virtual character, a new joint is constructed that is equal to the identity quaternion when A_virtual represents the initialization pose. These new joints are children of their corresponding virtual character joint causing them to follow any animations that take place. Essentially, a new set of affordances is defined by applying a rotation to each joint.

$$A\_equated=A\_initialPose^{-1}A\_virtual \quad (4)$$

where A_equated is the new set of affordances and A_initialPose is A_virtual when the virtual character is in the initialization pose. To be clear, all operations on sets are performed on each set element individually.

Figure 4:
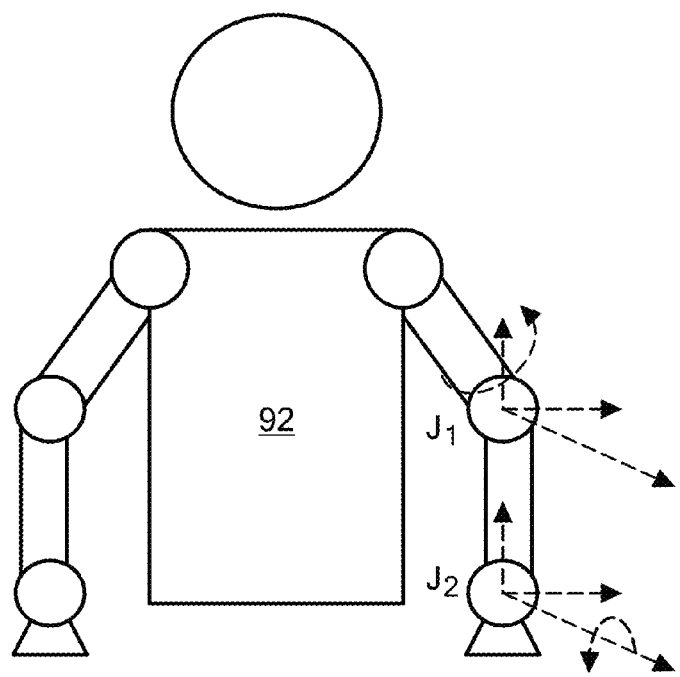
FIG. 4 is a schematic illustration of a virtual character.
Figure 5:
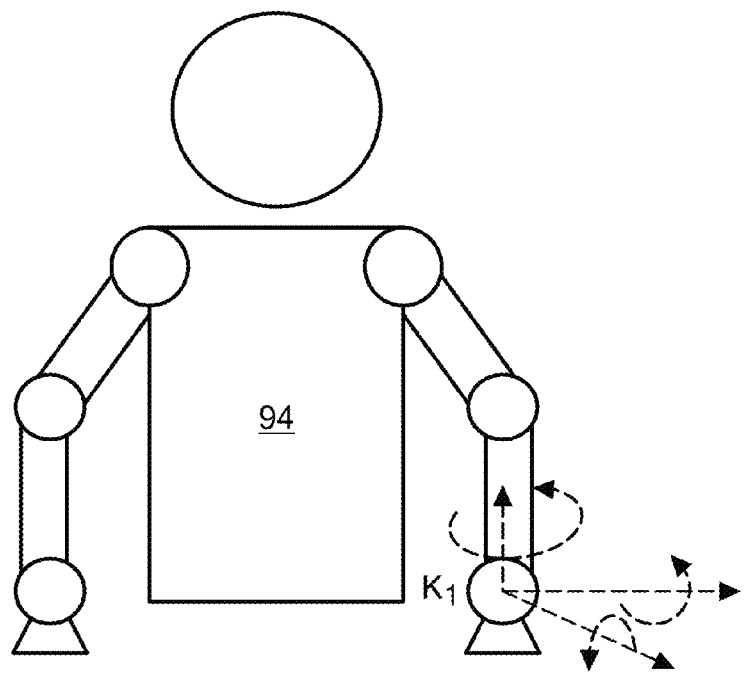
FIG. 5 is a schematic illustration of a humanoid robot.

In some cases, such as for the robot's head, this single step is enough to convert a joint from the virtual character; however, for most cases, additional transformations are required. The second step involves converting a joint into the appropriate space. When the robot and virtual character share the same joint, the virtual character's joint orientation must be transformed to local space. However, sometimes the conversion is more complex because the robot has fewer joints than the virtual character. If this occurs, multiple joints in a parent and child hierarchy must be mapped to a single joint by computing the difference between the child (or leaf) joint's rotation and the local rotation of the entire hierarchy. As an example, illustrated by reference to FIGS. 4 and 5, the master character 92 has two joints, J1 at the elbow (the parent joint) and J2 at the wrist (a child or leaf joint), that control the orientation of the palm. J1 contains an "arm twist" and J2 contains a "wrist pitch." The robot 94, however, does not have a function equivalent to an "arm twist." Instead, it only has one joint K1 to control "wrist orientation." A reduction transform, as shown in Equation 5 below, computes the local transform K1 on the robot as a function of the transforms J1 and J2 on the virtual character such that there is a minimal difference in the final pose achieved between the two. This step essentially maps A_equated to a new set, A_reduced, with the cardinality of A_robot.

$$A\_reduced=\{T_j^{-1}L_j|(j=1{:}m)\wedge(T_j\in A\_equated)\wedge(L_j\in A\_equated)\} \quad (5)$$

where m is the number of joints in the robot, $T_j$ is a quaternion equal to the top rotation of the hierarchy (J1 in the example above), and $L_j$ is the rotation of the leaf joint (J2 in the example above).

The next step involves converting A_reduced to the DH convention used for that particular joint. Specifically, the coordinate space of the joint in A_reduced is transformed to one where all of the axes align with the DH convention for the joint. Due to differences in the handedness of the coordinate systems, some axes may need to point in the opposite direction. Ultimately, the direction of the axes is irrelevant because the direction of rotation is set to match the DH convention. More formally, $$A\_converted=\{DHSpace_j A\_reduced_j|j=1{:}m\} \quad (6)$$

where m is the number of joints in the robot and DHSpace is a set of m rotations defining the coordinate system of each joint.

Once A_converted is established, its Euler angles can be extracted. Overall, there are many different ways to express an Euler angle varying in which order the rotations are applied and the direction of the rotation. For each joint in the robot, the rotation order and rotation direction must be defined. The resulting Euler angles denote the rotational difference between the virtual character's current pose and the robot's initialization pose. From these values, A_robot can be found and clamped so that its angles lie within the range of the robot's joints.

Exemplary embodiments of software routines that can perform the calculations of the above Equations are attached at the Appendix. It will be appreciated that other routines and algorithms can be used to perform the calculations herein.

Figure 3A:
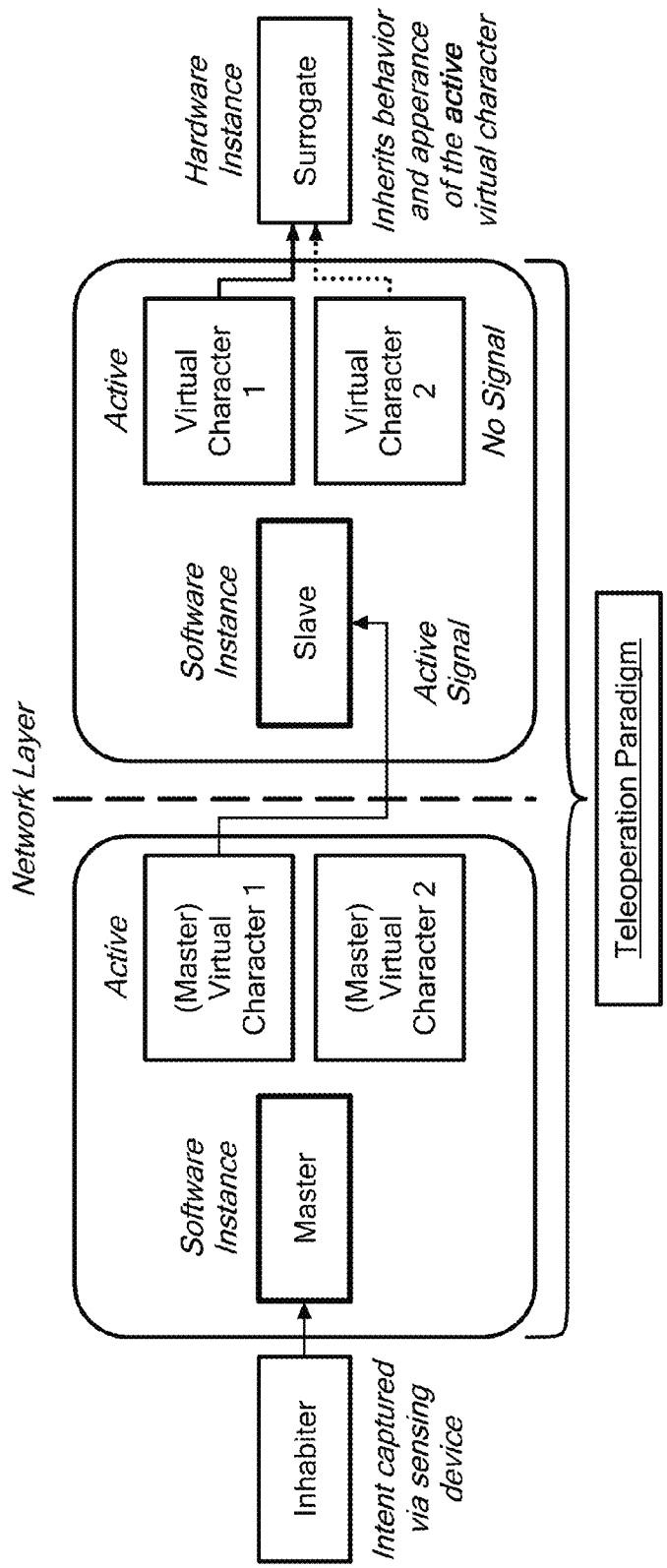
FIG. 3A is a schematic illustration of an embodiment of a master/slave paradigm of the control interface for controlling a humanoid robot from a remote location.
Figure 3B:
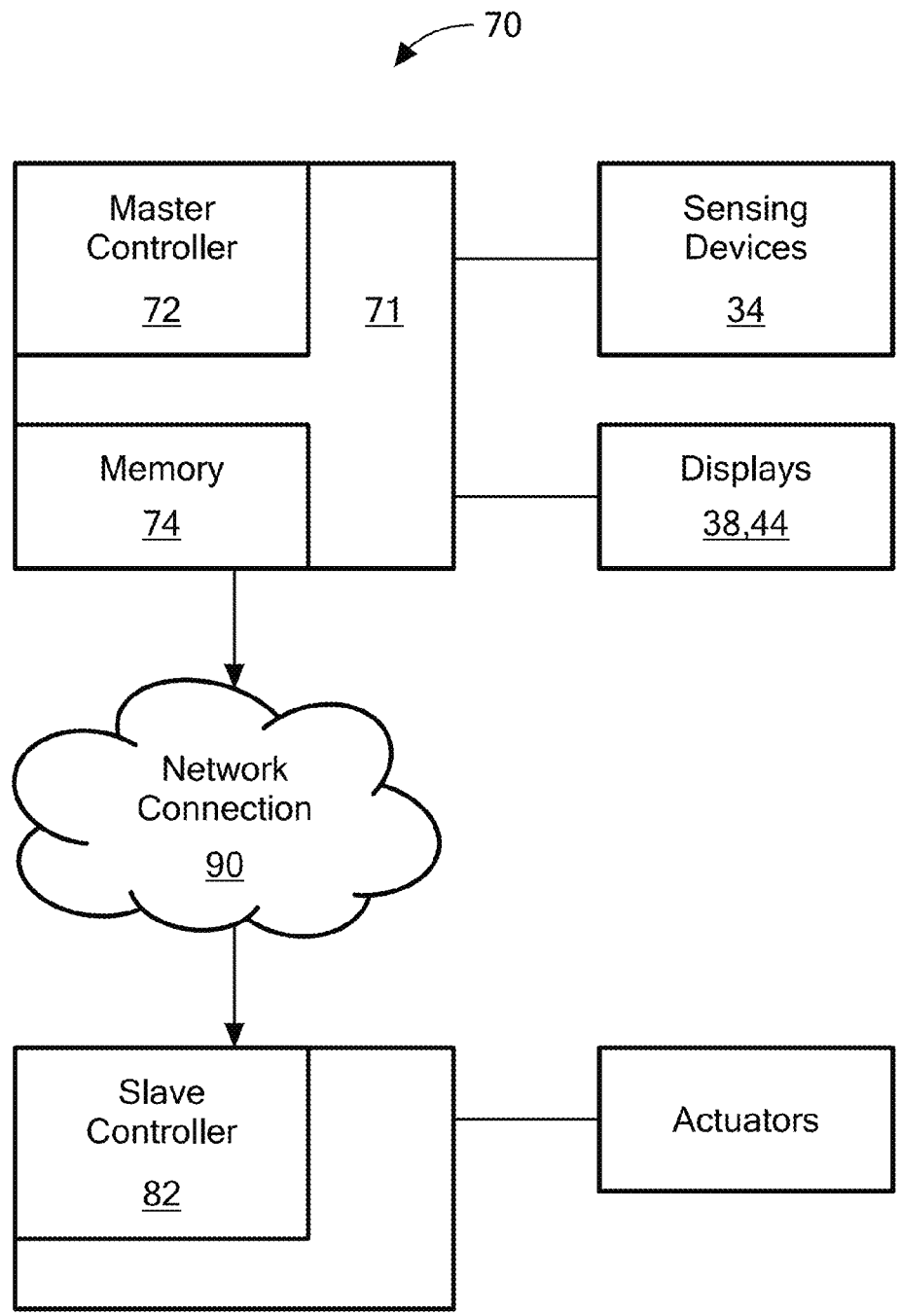
FIG. 3B is a schematic illustration of an embodiment of a hardware instantiation of a master/slave paradigm.

Referring to FIGS. 2, 3A, and 3B, the system includes an inhabiter station to support inhabiting the humanoid robot. The inhabiter station can be located remotely from the humanoid robot and can be portable so that a user can control the humanoid robot from any location. The inhabiter station includes one or more sensing devices 34 in communication with a computing device 71. A sensing device can be a physical input device to input physical positions and motions of the inhabiter to the computing device. The computing device includes one or more processors and memory for storing machine-readable instructions that, upon execution by the one or more processors, provide a plurality of outputs to the humanoid robot for controlling the at least one humanoid robot based upon the sensed positions and movements of the user and the input from the user. The station includes at least one and in some embodiments two display devices in communication with the computing device. One display device 38 displays an image of the virtual character. The other display device 44 displays a view seen by the humanoid robot, for example, a view of another person 46 with whom the inhabiter 32 is interacting via the virtual character 36. In another embodiment, the computing device can display two split windows, in which one window shows a view of the master virtual character that is being manipulated by the inhabiter while the second window shows a first-person view from the robot's perspective.

In one embodiment, a sensing device 34 can be a motion and orientation detection device that detects the position and orientation of a user, such as are used in the video game industry. Suitable devices include a joystick-based controller, a hand controlled magnetic tracking device (such as the Hydra game controller from Razer), a motion sensing device, an image-based motion recognition device (such as a standard web camera), a depth-based motion recognition device (such as a laser scanner or the Microsoft KINECT®), or an infrared (IR) motion sensing device (such as the head tracking device TrackIR from NaturalPoint). Multiple sensing devices can be used. More than one tracking device can be used with the inhabitor station. For example, referring again to FIG. 2, two magnetic tracking devices 52, one for each user's hand, with an associated base 54 can be combined with a reflective marker or IR signal emitter 56 worn on a user's head that is detectable by an IR sensor 58 located in a region to detect motion of the user's head. For example, the IR sensor can be located on top of the display device 38 that displays the virtual character.

In one embodiment, a magnetic tracking device includes a base 54 and two hand-held controllers 52. Each controller has six buttons, a control stick, and an analog trigger. The tracking device tracks the three-dimensional position and orientation of both controllers with respect to the base, providing the user with six degrees of freedom on each controller. Internally, the device software assigns a controller two sets of positions and rotations, one for each hemisphere around the base. Because the device sensors are unable to determine which hemisphere the controller lies inside, a brief calibration procedure is required upon initialization that involves pointing both controllers toward the base. Using this information, the correct hemisphere can be found; however, the user will be restricted to a single hemisphere during operation.

Figure 6:
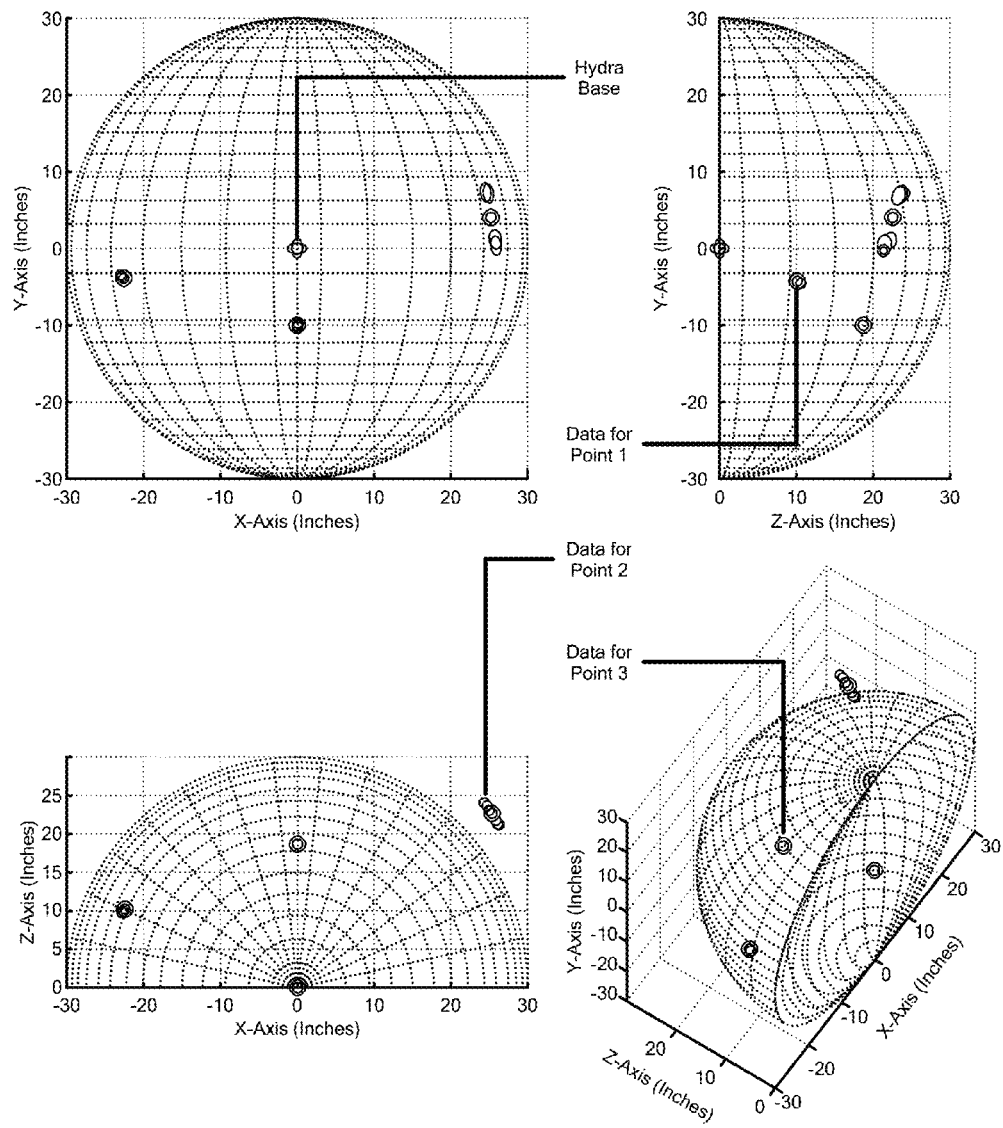
FIG. 6 is an illustration of testing of a magnetic tracking device.

In order to evaluate the accuracy of the tracking device, several tests were performed using a Hydra Razer. These tests evaluated the ability of the device to replicate the same coordinates when positioned at the same location in the environment. To do this, three points were selected nearby the base of the tracking device and their distance from the base was measured. Next each controller was placed at the predefined point and the coordinates were recorded for two seconds. In total, each controller was tested in this fashion three times for each point. See FIG. 6. The table below shows the standard deviation of each controller at each point across the three tests. These standard deviations were converted from the tracking device space to inches by computing a scaling factor to center the data points onto their ground truth value.

| Trial | Coordinates (inches) [X, Y, Z] | Std Dev (left controller) [X, Y, Z] | Std Dev (right controller) [X, Y, Z] |
|---|---|---|---|
| 1 | [−22.5, −4, 10] | [0.0403, 0.0219, 0.0442] | [0.0664, 0.0211, 0.0205] |
| 2 | [25.25, 4, 22.5] | [0.2556, 0.1509, 0.2796] | [0.1265, 2.3619, 0.2637] |
| 3 | [0.1, −10, 18.5] | [0.0108, 0.0361, 0.0821] | [0.0040, 0.0199, 0.0245] |

In one embodiment of an imaging sensor, an optical tracking device is provided. The tracking device can have any suitable frame rate, such as 120 fps, and field of view, such as 51.7°. An inhabiter can wear, for example, a cap fitted with a retro-reflective pattern whose geometry is known. The position and rotation of the inhabiter's head, in 6 degrees of freedom, can be computed using information about the spacing and size of the "blobs" in the image plane. This information can be used to infer the inhabiter's head motion. Commercial imaging sensor systems are available. One suitable system is TrackIR.

In one embodiment, an inhabiter uses both an imaging sensor and a tracking device to control the virtual character. Using the imaging sensor, a one-to-one mapping is created between the orientation of the user's head and the rotation of the virtual character's neck joint. All other joints are indirectly controlled through the tracking device by way of micro-poses. A micro-pose is a simplified animation that contains two key frames or two distinct poses. As a result, the beginning of the micro-pose animation is the first key frame while the end of the micro-pose animation is the last key frame. Any point in the middle of the animation is a mixture of both poses. By giving the inhabiter the ability to select micro-poses and their time positions, a highly expressive real time user interface can be created without the need to specify individual joint orientations.

The simplest method for controlling the virtual character restricts the inhabiter to a single micro-pose at every time instant. Each micro-pose that the character can assume is mapped to two three-dimensional positions representing the positions of the left and right tracking device controllers. This mapping is generated during a calibration procedure discussed further below. Consequently, $$\text{calibration} = \{lx_i, ly_i, lz_i, rx_i, ry_i, rz_i | i=1:n\} \quad (7)$$

where n is the number of micro-poses, i is an integer id for a micro-pose, and $(lx_i, ly_i, lz_i)$ and $(rx_i, ry_i, rz_i)$ represent the positions of the left and right controllers of the tracking device respectively. Once this mapping is established, the system measures the euclidean distance between the current tracking device controller positions and each of the micro-poses. From these measurements, each micro-pose is scored as shown below.

$$dist(x_1, y_1, z_1, x_2, y_2, z_2) = \sqrt{(x_1 - x_2)^2 + (y_1 - y_2)^2 + (z_1 - z_2)^2} \quad (8)$$

$$\text{score} = dist(lx_i, ly_i, lz_i, cx, cy, cz) + dist(rx_i, ry_i, rz_i, cx, cy, cz) \quad (9)$$

where (cx, cy, cz) represent the current position of the tracking device. If the inhabiter positions the tracking device controllers such that the lowest scoring micro-pose is constant and different from the current micro-pose for a period of time, then the system will automatically switch the current micro-pose to the lowest scoring micro-pose. The transition however, is not instantaneous. Instead, the new pose's weight is increased at a set rate while the old pose's weight is decreased at the same rate. In this manner, micro-pose transitions appear smooth and seamless to the inhabiter and anyone engaged with the robot. Furthermore, there is a short time delay from when the inhabiter assumes a pose with the tracking device and when the micro-poses begin to blend. This delay prevents the user from unintentionally assuming a micro-pose calibrated to lie in between the current pose and the desired pose.

The time position of the assumed micro-pose is controlled by the roll of the tracking device controllers. This allows the inhabiter to move the character without changing the micro-pose. To promote smooth animations, simple exponential smoothing is applied to the roll values, and the rate of changed is clamped to be under a set value.

Alternatively, it is also possible to bind a micro-pose to a single hand making it possible for multiple micro-poses to be assumed at the same time. In order to generalize the prior control algorithm, the notion of pose types is introduced. Overall, there are four different pose types: "both," "left," "right," and "main." Micro-poses marked as "both" are controlled as in the previous algorithm requiring both hands close to the correct position. Conversely, the "left" and "right" pose types only depend on the position of a single controller. Additionally, these animations are set to only manipulate the joints on one side of the body allowing the combination of "left" and "right" micro-poses without fighting. As a result, the scoring function is re-written as $$\text{score} = \begin{cases} \text{dist}(lx_i, ly_i, lz_i cs, cy, cz) + \\ \text{dist}(rx_i, ry_i, rz_i cs, cy, cz) & \text{if type = both} \\ 2\text{dist}(lx_i, ly_i, lz_i cs, cy, cz) & \text{if type = left} \\ 2\text{dist}(rx_i, ry_i, rz_i cx, cy, cz) & \text{if type = right} \end{cases} \quad (10)$$

Anytime single handed micro-poses are used, a single "main" micro-pose must be defined as well. The "main" micro-pose animates the joints that are not controlled by the "left" or "right" micro-poses. Furthermore, the "main" micro-pose can be calibrated as both a "left" and "right" handed micro-pose. In this manner, for each hand, the inhabiter can choose among the set of single handed poses for the corresponding hand and the default pose.

As previously mentioned, the robot joints can be made of actuators that are either electric (DC motors) or pneumatic (fluidic muscles), coupled with passive impedance elements (linear or torsional springs).

Each of these joints must be tuned based on its anticipated step responses during inhabiting. The actuators can be controlled in either position mode or velocity mode. Position mode typically involves a predetermined velocity profile to move between start and end positions—this profile is different for the electric and the pneumatic actuators. The response also results in a motion that does not capture an inhabiter's intent faithfully since there is a loss of velocity information. The constant velocity response in position mode can also cause aliasing artifacts where a new position demand is received before completion of the previous request. This can affect the perceived gestures at the remote site during inhabiting. In order to overcome this limitation, the joints are tuned in velocity mode. This can be achieved by varying the torque to the actuation mechanism but open-loop current-based control of the torque is noisy and inaccurate. Adding a feedback sensor to achieve this can be expensive and complicate the mechanical design. For present purposes, the inhabiter's velocity information is used to close the loop on the position without actually monitoring the applied torques. This helps achieve a much smoother and representative response of the inhabiter's intent. For DC motors, this is fairly straight-forward since it involves computing the PID gains required to achieve the desired response. Tuning is performed using the Pessen Integral method. The fluidic muscles are coupled with spring elements. Velocity control of these actuators therefore takes into account the passive impedance of the springs. By calibrating the applied torque against the joint space position, an equation for the balancing torque ($\tau_b$) is obtained in the form $$\tau_b = \gamma_1(\theta^2) + \gamma_2(\theta) - \gamma_3 \quad (11)$$

where the coefficients $\gamma_1$, $\gamma_2$, $\gamma_3$ are dependent on the specific joint under consideration. Additional torque must compensate for the error e between desired ($\theta_d$) and actual ($\theta_a$) positions. Control torque required for any joint 'n' can therefore be written as:

$$\tau_n = \tau_{bn} + K_p(e) + k_i \int (e \cdot dt) + K_d(de/dt) \quad (12)$$

The problem becomes more complex when using feedforward terms, where the torque from each link is included in the equations to compensate for the coupling effects during joint motion and is not addressed in this work.

As mentioned above, the micro-poses for a virtual character must be calibrated in order to use the system. The number of micro-poses for each virtual character is pre-selected based on several factors such as desired level of fidelity during an interaction. In addition, there are limits to the number of programmable micro-poses for a character depending on the signal-noise ratio of the chosen control or tracking device. The physical robot is opaque to the actual virtual character and its micro-poses. This offers the ability to switch between multiple virtual characters (and hence, robotic surrogates) in real time. Correspondingly, the robot can inherit the behavioral and appearance properties of the active virtual character. The benefits to this approach include:

1) To a person interacting with this robot, an almost instantaneous change in behavior and appearance of the robot can be observed. As an example, a robot with the ability to change both appearance and behavior can be particularly useful during cross-cultural training and communication.

2) To a person controlling this robot, the ability to "teleport" between characters exists. This allows an inhabiter to proverbially be in "two places at the same time". By jumping back-forth between the virtual characters, corresponding instances of robotic surrogates can be activated.

Figure 7:
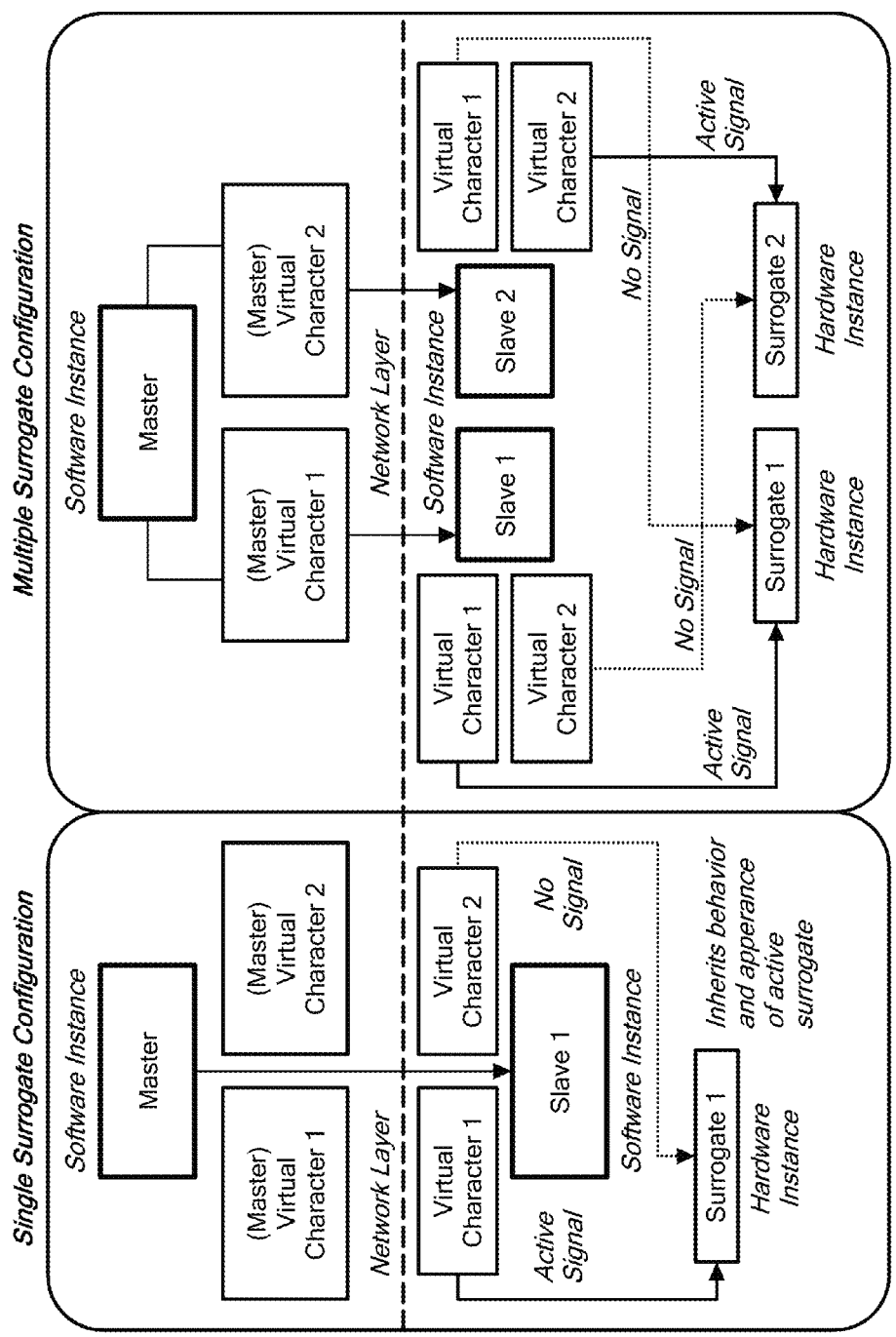
FIG. 7 is a schematic illustration of a further embodiment of an architecture of a control interface for controlling a humanoid robot at a remote location.

FIG. 7 shows two possible architectures supported by the paradigm. In the single surrogate configuration (left), an inhabiter can have several virtual characters in the scene and opt to inhabit any one of them. Once activated, the robot simply inherits the appearance and behaviors (micro-poses) of the active virtual character (e.g., Surrogate 1 corresponding to Virtual Character 1 in FIG. 7). One can imagine the use of this system to make the robot appear as two different characters with varying demographics depending on the subject who is interacting with it in the remote environment. In the multiple surrogate configuration (right), the inhabiter's interface remains the same as in the previous case. However, multiple slaves can be launched in the remote environment. The slaves can be located in the same or in physically separate environments (multiple remote locations). When a master virtual character is activated, the corresponding slave character receives and transmits these signals to its hardware instance locally. When combined with the other infrastructure of the inhabiter station that includes support for video feeds and conversations via the surrogate in the remote setting, a feeling of "teleportation" may be experienced by an inhabiter.

Figure 8:
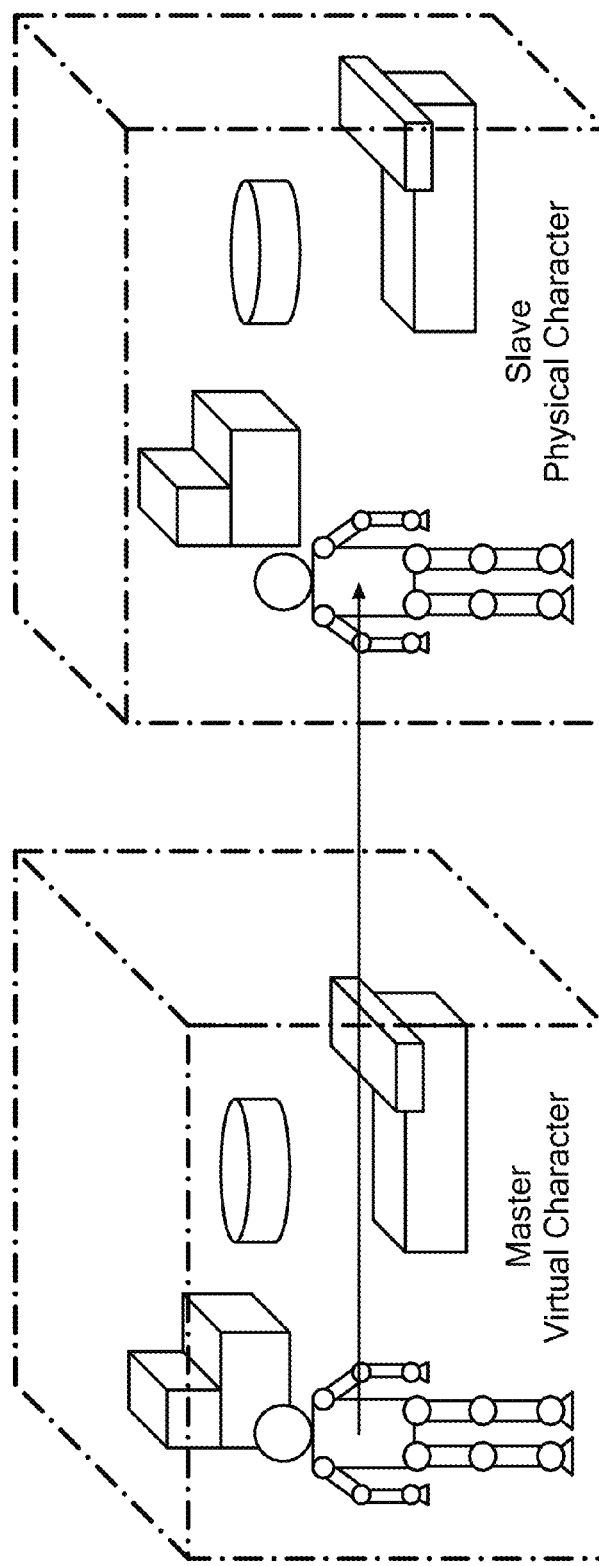
FIG. 8A is a schematic illustration of a virtual character displayed in an environment based on a remote environment at which a humanoid robot is located.
FIG. 8B is a schematic illustration of a humanoid robot in a real environment.
Figure 9:
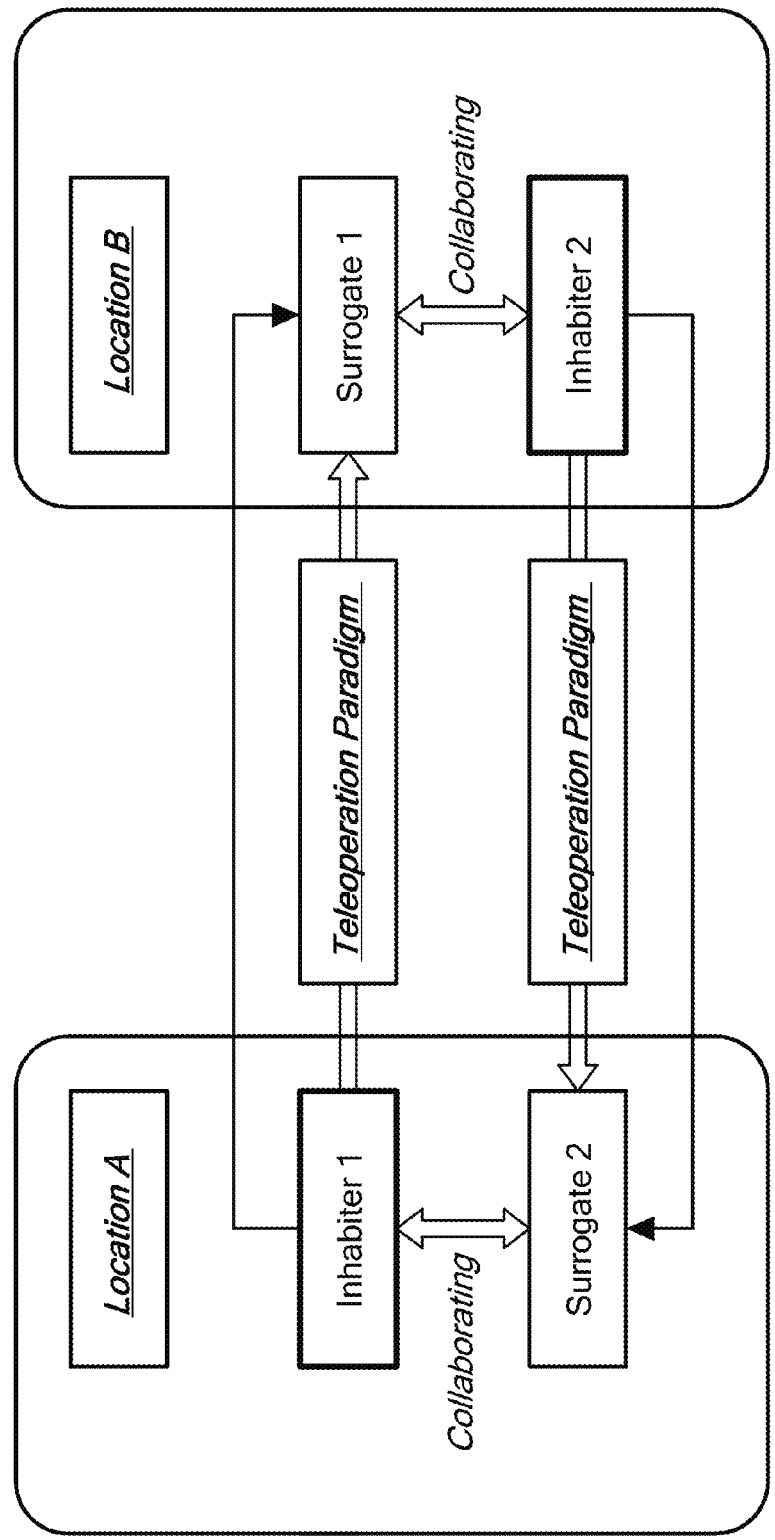
FIG. 9 is a schematic illustration of a further application of a control interface for controlling a humanoid robot at a remote location.

The master virtual character can be created in a virtual environment that is representative of the slave robot's physical environment. For example, the virtual environment can be constructed using a suite of sensors on the slave robot or in the robot's environment. For example, furniture items in the robot's physical environment can be reproduced in the virtual character's virtual environment and can be seen on the display. See FIG. 8. Although described particularly herein as being controlled by a human user, in another embodiment, the virtual character can be controlled using a hybrid model of artificial intelligence and direct human control. In yet another embodiment, a collaborative application can employ the present control interface in two separate locations, such that two users can each inhabit a robot at the other's location. See FIG. 9.

The underlying paradigm offers the added functionality of being able to calibrate each slave virtual character independently. This helps in reducing the cognitive load of an inhabiter while controlling multiple surrogate instances. For instance, a group of surrogates could have different greeting gestures depending on their demographics, but the inhabiter could create the same calibration for all of the poses. With this setup, the inhabiter can still greet people in the remote environment by performing the same standard action while the surrogate at the remote end automatically handles the culturally appropriate greeting.

Specifically, the calibration routine assigns two three-dimensional positions corresponding to the positions of each of the tracking device controllers for each micro-pose. An inhabiter can enter calibration mode prior to taking control of the robotic surrogate. In the calibration mode, the virtual character will cycle through all of its pre-defined poses. The inhabiter then positions the tracking device controllers into their preferred position in correspondence to the currently displayed micro-pose. A time-dependent routine automatically records the controller positions and advances to the next micro-pose for that virtual character. After calibrating, the inhabiter is then given a chance to test the new settings and redo the calibration procedure if necessary. In this manner, the user interface can be tailored to a specific inhabiter's needs.

The master controller can be part of a computer system that executes programming for controlling the humanoid robot as described herein. The computing system can be implemented as or can include a computing device 71 that includes a combination of hardware, software, and firmware that allows the computing device to run an applications layer or otherwise perform various processing tasks. Computing devices can include without limitation personal computers, work stations, servers, laptop computers, tablet computers, mobile devices, hand-held devices, wireless devices, smartphones, wearable devices, embedded devices, microprocessor-based devices, microcontroller-based devices, programmable consumer electronics, mini-computers, main frame computers, and the like.

The computing device can include a basic input/output system (BIOS) and an operating system as software to manage hardware components, coordinate the interface between hardware and software, and manage basic operations such as start up. The computing device can include one or more processors and memory that cooperate with the operating system to provide basic functionality for the computing device. The operating system provides support functionality for the applications layer and other processing tasks. The computing device can include a system bus or other bus (such as memory bus, local bus, peripheral bus, and the like) for providing communication between the various hardware, software, and firmware components and with any external devices. Any type of architecture or infrastructure that allows the components to communicate and interact with each other can be used.

Processing tasks can be carried out by one or more processors. Various types of processing technology can be used, including a single processor or multiple processors, a central processing unit (CPU), multicore processors, parallel processors, or distributed processors. Additional specialized processing resources such as graphics (e.g., a graphics processing unit or GPU), video, multimedia, or mathematical processing capabilities can be provided to perform certain processing tasks. Processing tasks can be implemented with computer-executable instructions, such as application programs or other program modules, executed by the computing device. Application programs and program modules can include routines, subroutines, programs, drivers, objects, components, data structures, and the like that perform particular tasks or operate on data.

The computing device includes memory or storage, which can be accessed by the system bus or in any other manner. Memory can store control logic, instructions, and/or data. Memory can include transitory memory, such as cache memory, random access memory (RAM), static random access memory (SRAM), main memory, dynamic random access memory (DRAM), and memristor memory cells. Memory can include storage for firmware or microcode, such as programmable read only memory (PROM) and erasable programmable read only memory (EPROM). Memory can include non-transitory or nonvolatile or persistent memory such as read only memory (ROM), hard disk drives, optical storage devices, compact disc drives, flash drives, floppy disk drives, magnetic tape drives, memory chips, and memristor memory cells. Non-transitory memory can be provided on a removable storage device. A computer-readable medium can include any physical medium that is capable of encoding instructions and/or storing data that can be subsequently used by a processor to implement embodiments of the method and system described herein. Physical media can include floppy discs, optical discs, CDs, mini-CDs, DVDs, HD-DVDs, Blu-ray discs, hard drives, tape drives, flash memory, or memory chips. Any other type of tangible, non-transitory storage that can provide instructions and/or data to a processor can be used in these embodiments.

The computing device can include one or more input/output interfaces for connecting input and output devices to various other components of the computing device. Input and output devices can include, without limitation, keyboards, mice, joysticks, microphones, displays, monitors, scanners, speakers, and printers. Interfaces can include universal serial bus (USB) ports, serial ports, parallel ports, game ports, and the like.

The computing device can access a network over a network connection 90 that provides the computing device with telecommunications capabilities. Network connection enables the computing device to communicate and interact with any combination of remote devices, remote networks, and remote entities via a communications link. The communications link can be any type of communication link, including without limitation a wired or wireless link. For example, the network connection can allow the computing device to communicate with remote devices over a network, which can be a wired and/or a wireless network, and which can include any combination of intranet, local area networks (LANs), enterprise-wide networks, medium area networks, wide area networks (WANs), the Internet, or the like. Control logic and/or data can be transmitted to and from the computing device via the network connection. The network connection can include a modem, a network interface (such as an Ethernet card), a communication port, a PCMCIA slot and card, or the like to enable transmission of and receipt of data via the communications link.

The computing device can include a browser and a display that allow a user to browse and view pages or other content served by a web server over the communications link. A web server, server, and database can be located at the same or at different locations and can be part of the same computing device, different computing devices, or distributed across a network. A data center can be located at a remote location and accessed by the computing device over a network.

The computer system can include architecture distributed over one or more networks, such as, for example, a cloud computing architecture. Cloud computing includes without limitation distributed network architectures for providing, for example, software as a service (SaaS), infrastructure as a service (IaaS), platform as a service (PaaS), network as a service (NaaS), data as a service (DaaS), database as a service (DBaaS), backend as a service (BaaS), test environment as a service (TEaaS), API as a service (APIaaS), and integration platform as a service (IPaaS).

It will be appreciated that the various features of the embodiments described herein can be combined in a variety of ways. For example, a feature described in conjunction with one embodiment may be included in another embodiment even if not explicitly described in conjunction with that embodiment.

The present invention has been described in conjunction with certain preferred embodiments. It is to be understood that the invention is not limited to the exact details of construction, operation, exact materials or embodiments shown and described, and that various modifications, substitutions of equivalents, alterations to the compositions, and other changes to the embodiments disclosed herein will be apparent to one of skill in the art.

What is claimed is:

1. A system for controlling a humanoid robot from a remote location, the system comprising:
    one or more sensing devices to sense spatial positions and movements of a user physically present in the remote location; and
    a computing device in communication with the one or more sensing devices, the computing device comprising one or more processors and memory, and including computer-executable instructions stored in the memory that, upon execution by the one or more processors, receive the sensed spatial positions and movements of the user, generate a virtual character based upon the sensed spatial positions and movements of the user, animate the virtual character with motions that correspond to the sensed spatial positions and movements of the user, and provide a plurality of outputs for controlling the humanoid robot based upon the motions of the virtual character,
    wherein the one or more processors of the computing device include a master controller located at the remote location operative to generate the virtual character and to translate the motions of the virtual character into instructions to control motion of the humanoid robot, the master controller in communication with a slave controller located at and in communication with the humanoid robot to transmit the instructions to the slave controller,
    whereby the spatial positions and movements of the user directly correspond to the motion of the humanoid robot.

2. The system of claim 1, wherein the master controller includes a graphics rendering engine and a physics engine including instructions operative to translate motions of the user into a three-dimensional animation of the virtual character.

3. The system of claim 1, wherein the animated motions of the virtual character comprise an interpolation between key frames or between time-positions or a combination thereof.

4. The system of claim 1, wherein the computing device is operative to provide a real time mapping between motions of the user and motions of the humanoid robot.

5. The system of claim 1, wherein
    the motions of the virtual character including one or more accelerations of one or more joints of the virtual character,
    the computing device is operative to determine a torque or force to apply to a joint of the humanoid robot based on the one or more accelerations of the one or more joints of the virtual character,
    the computing device is operative to provide an output of the determined torque or force to apply to the joint of the humanoid robot for controlling movement of the joint of the humanoid robot.

6. The system of claim 1, wherein a number of degrees of freedom of motion of the user and a number of degrees of freedom of the animated motions of the virtual character are each greater than a number of degrees of freedom of motion of the humanoid robot.

7. The system of claim 1, wherein the virtual character has a number of joints undergoing the motions of the virtual character, each motion of each joint corresponding to the physical movement of a joint of the user, and the computing device is operative to assign a uniform coordinate system to the each joint of the virtual character.

8. The system of claim 7, wherein the computing device is operative to store in memory data comprising at least one of pitch, yaw, and roll orientation for the each joint of the virtual character, the number of joints including at least two of a shoulder joint, an elbow joint, a wrist joint, a finger joint, a neck joint, a waist joint, a hip joint, a knee joint, and an ankle joint.

9. The system of claim 1, wherein the virtual character has a number of joints undergoing the motions of the virtual character, each joint corresponding to the physical movement of a joint of the user, and the computing device is operative to store an orientation of the each joint of the virtual character as a quaternion, and includes instructions to transform the orientation of the each joint of the virtual character to an orientation of each joint of the humanoid robot stored as a Euler angle.

10. The system of claim 9, wherein the transform instruction comprises mapping the set of orientations for the each joint of the virtual character to the set of orientations for the each joint of the humanoid robot.

11. The system of claim 9, further comprising constructing a new set of orientations for the each joint of the virtual character by applying a rotation operation to the each joint of the virtual character.

12. The system of claim 9, further comprising mapping multiple joints of the virtual character to a single joint of the humanoid robot.

13. The system of claim 12, wherein the mapping comprises generating a reduced set having a reduced number of orientations of the virtual set equal to the number of joints of the humanoid robot, the reduced set including a quaternion equal to a top rotation of a hierarchy of joints and a rotation of a leaf joint of the humanoid robot.

14. The system of claim 13, further comprising converting the reduced set of orientations to a converted set of orientations of the joints of the humanoid robot utilizing a Denavit-Hartenberg convention applicable to a corresponding joint of the humanoid robot.

15. The system of claim 14, wherein the Euler angle is extracted for the corresponding joint of the humanoid robot.

16. The system of claim 1, wherein:
    the computing device provides a plurality of selectable micro-poses and receives a selected micro-pose via input from the user; and
    the computing device causes the humanoid robot to perform the selected micro-pose.

17. The system of claim 1, wherein the one or more sensing devices comprise a physical input device coupled to the computing device to input physical motions of the user to the computing device.

18. The system of claim 17, wherein the physical input interface comprises a joystick device, a magnetic tracking device, a motion sensing device, an image-based motion recognition device, a depth-based motion recognition device, an infrared (IR) motion sensing device, or combinations thereof.

19. The system of claim 1, wherein the one or more sensing devices comprise one or more reflective markers positioned on a head of the user, and an infrared (IR) image sensor coupled to the computing device to determine a head position of the user based upon tracking of the one or more reflective markers.

20. The system of claim 1, wherein the computing device controls head motion of the virtual character based upon a head movement of the user and the plurality of outputs includes a head movement of the humanoid robot corresponding to the head motion of the virtual character.

21. The system of claim 1, wherein the computing device controls arm motion of the virtual character based upon an arm movement of the user and the plurality of outputs includes an arm movement of the humanoid robot corresponding to the arm motion of the virtual character.

22. The system of claim 1, wherein the computing device provides corresponding pluralities of outputs for controlling a plurality of humanoid robots in different locations.

23. The system of claim 22, wherein the computing device provides a menu stored in the memory and displayable on a display for selecting a current humanoid robot from the plurality thereof.

24. The system of claim 1, wherein the computing device provides a plurality of virtual character configurations stored in memory and receives a selected virtual character configuration from the user for processing by the computing device.

25. The system of claim 24, wherein
each of the plurality of virtual character configurations is controlled by a plurality of additional users located at locations remote from the remote location occupied by the user,
the computing device is operative to switch between selected virtual characters in real time upon input of an updated virtual character selection from one of the additional users,
such that each of the plurality of additional users is capable of controlling the motion of the humanoid robot using a corresponding virtual character.

26. The system of claim 24, wherein any of the plurality of virtual characters is used to control the humanoid robot.

27. The system of claim 24, wherein the computing device includes stored in the memory a plurality of motions of the virtual character, each motion representative of a user behavior.

28. The system of claim 1, further comprising a display coupled to the computing device to provide a third person view of the virtual character as a representation of the user and a first person view from the humanoid robot.

29. The system of claim 28, wherein the display comprises a first display device coupled to the computing device to provide the third person view of the virtual character and a second display device coupled to the computing device to provide the first person view from the humanoid robot.

30. The system of claim 28, wherein the computing device includes instructions operative to display the third person view of the virtual character and the first person view from the humanoid robot as separate screens or windows on one display device or on two display devices.

31. The system of claim 1, wherein the system further includes a microphone to record audio from the user in real-time and the computing device includes instructions to transmit recorded or live audio to the humanoid robot synchronized with the sensed positions and movements of the user.

32. A humanoid robot system comprising:
the system for controlling a humanoid robot from a remote location of claim 1; and
a humanoid robot in communication with the control system.

33. The system of claim 32, wherein the humanoid robot includes one or more joints, an actuator connected to each joint to control rotation of the connected joint, and the computing device is operative to transmit instructions to the slave controller to actuate rotation of a selected joint via the connected actuator.

* * * * *